US006910446B2

(12) United States Patent
Johnston Jr.

(10) Patent No.: US 6,910,446 B2
(45) Date of Patent: Jun. 28, 2005

(54) VACCINE SPRAY SYSTEM

(75) Inventor: Joseph H. Johnston Jr., Gainesville, GA (US)

(73) Assignee: Merial Limited, Duluth, GA (US)

( * ) Notice: Subject to any disclaimer, the term of this patent is extended or adjusted under 35 U.S.C. 154(b) by 195 days.

(21) Appl. No.: 10/350,557

(22) Filed: Jan. 24, 2003

(65) Prior Publication Data

US 2004/0144873 A1 Jul. 29, 2004

Related U.S. Application Data

(60) Provisional application No. 60/425,987, filed on Nov. 13, 2002.

(51) Int. Cl.[7] ................................................ A01K 13/00

(52) U.S. Cl. ........................ 119/651; 119/665; 239/264

(58) Field of Search ................................ 119/651, 665, 119/666, 667, 669; 239/246, 263.1, 264

(56) References Cited

U.S. PATENT DOCUMENTS 883,132 A * 3/1908 Goff ........................... 119/669
2,489,445 A * 11/1949 Benzuly ..................... 118/305
4,316,464 A 2/1982 Peterson ..................... 604/290
4,342,285 A * 8/1982 James ........................ 119/669
5,037,672 A * 8/1991 Daussan et al. ............ 427/236
5,630,379 A * 5/1997 Gerk et al. ................. 119/667

* cited by examiner

*Primary Examiner*—Robert P. Swiatek
(74) *Attorney, Agent, or Firm*—Judy Jarecki-Black; Merial Limited

(57) ABSTRACT

A spray delivery system and methods of use thereof, suitable for delivering a fan-shaped vaccine spray to birds or chicks held within an open-topped container, comprising a cover, an elongated guide rail mounted thereon, and a spray head may move reversibly on the guide rail. The spray head comprises a spray nozzle assembly having a spray port and optionally a fan-shaped nozzle for delivering a fan-shaped fluid spray. The cover has an elongated slot that permits the spray nozzle assembly to extend below the plane of the cover while allowing the spray nozzle assembly to freely traverse the length of an open-topped container placed beneath the cover. By reversibly moving the spray head along the guide rail, the spray delivery system can deliver a substantially uniform fluid spray to an open-topped container with minimal overspray and reduced fluid wastage.

22 Claims, 10 Drawing Sheets

VACCINE SPRAY SYSTEM

This application claims priority to Provisional Application No. 60/425,987, filed Nov. 13, 2002.

The present invention is directed to an apparatus for spray delivering a fluid to a stationary open-topped container such that a substantial area of the container will receive the fluid spray. The present invention is further directed to a method of delivering a uniform fluid spray to a stationary open-topped container by ejecting a fan-shaped droplet spray from a moveable spray nozzle.

BACKGROUND

Large populations of birds raised in enclosed environments for commercial purposes under crowded conditions are highly susceptible to the spread of infectious agents.

Consequently, poultry typically are vaccinated to afford protection against a number of diseases, particularly of viral origin, that could otherwise decimate a flock. Optimum protection is most often afforded by vaccinating young birds or chicks.

While vaccines can be dispensed to individual birds or chicks by injection delivery, such a procedure is expensive, time-consuming and labor-intensive. Manual handling of the chicks can induce stress or injury from the needle, and may even initiate secondary infections from cross-contamination. Automatic inoculation devices that rapidly inject birds reduce the disadvantages of manual injection, but cannot eliminate individual handling each bird or chick.

Such devices offer automatic charging of syringes and introduction of the injection needle into a bird held against the device, which then delivers the inoculum dose. Alternative methods to injection delivery that are less injurious to the birds have included the manual dispensation of liquid vaccines directly to the mouths, eyes or respiratory channels of chicks. However, these methods remain labor-intensive and costly.

Spray delivery of aerosolized vaccines allows the simultaneous treatment of large numbers of chicks without the disadvantage of manual handling of individual birds. The vaccine fluid is delivered to a flock of chicks by direct contact of the vaccine droplets with the eye, or the spray mist is inhaled to contact the respiratory tract. Spray delivery apparatus pass containers with chicks beneath a fixed spray nozzle using a conveyor belt or maximize spray coverage of the chicks by using multiple overhead spray nozzles, such as described in U.S. Pat. No. 4,316,464 to Peterson. Conveyor belt systems, however, are complex and costly and not readily transportable, requiring that the chick containers be brought to the site of vaccination.

Fixed spray jets are usually ejected from spray nozzles with a circular configuration that results in areas of a rectangular container receiving inadequate exposure to fluid, or spraying beyond the container resulting in significant wastage of expensive vaccine fluid. Spray jets may also be oval and provide a fan-shaped spray that may more completely cover the area of the chick container.

What is needed, therefore, is a spray delivery system that provides a uniform spraying of a container, with minimal vaccine wastage, but resulting in maximum exposure of the recipient chicks to the vaccine. What is further needed is a spray delivery system capable of delivering a fluid spray to a container of birds but does not require complex and costly container conveyor belt systems to pass the birds under the fluid spray.

SUMMARY OF THE INVENTION

Briefly described, the present invention provides a spray delivery system suitable for delivering a fluid spray to birds or chicks held within an open-topped container. The spray delivery system, therefore, comprises an elongated guide rail upon which at least one spray head may move reversibly. The elongated guide rail may be a pneumatically operated rodless cylinder with the spray head(s) attached thereto to allow reciprocal movement of the spray head(s) along the guide rail. A spray nozzle assembly on the spray head(s) may comprise a spray port and a fan-shaped nozzle for delivering a fan-shaped fluid spray. By reversibly moving the spray head along the guide rail, the spray delivery system may deliver an almost uniform fluid spray to an open-topped container, with minimal overspray and reduced wastage.

The elongated guide rail is mounted on a cover that has an elongated slot that permits the spray nozzle assembly to extend below the plane of the cover, while allowing the spray nozzle assembly to freely traverse the length of an open-topped container placed beneath the cover. The cover may also have sidewalls, thereby forming a tunnel for receiving the open-topped container. The cover may be standing on a base, the bottom edges of the cover contacting the base, or the cover may be suspended over an area for receiving the container, with the sidewalls of the cover not contacting the base.

The present invention further provides a method of delivering a fluid spray to an open-topped container of birds or chicks. The container with the chicks is positioned beneath the cover and approximately centralized relative to the elongated slot in the cover. A fan-shaped spray nozzle passes through the slot and may be height-adjusted to provide substantially total spray coverage of the width of the container with minimal overspray. The fluid, which may be, but is not limited to a vaccine, a medicament or a combination of both, is delivered to the spray nozzle assembly from a fluid container. A pump may pressurize the fluid. It is contemplated, however, that the fluid can be forced from a spray nozzle assembly by a pressurized gas applied to the fluid in the fluid container or the fluid may be sucked from the fluid container by a pressurized gas stream. The spray head, having the spray nozzle assembly thereon, can reversibly travel along the elongated guide rail by a switchable powered means such as a hydraulic or an electric motor having a toothed wheel, the toothed wheel engaging a toothed track on the elongated guide rail, or a belt-driven system. A preferred switchable power means is a reversible pneumatic means operably connected to activate a rodless cylinder to which the spray head(s) is operably attached. The movement of the spray head ensures substantially total spray coverage over the length, as well as the width, of the container.

Reciprocal passes of the spray head along the elongated guide rail may be repeated to achieve desired fluid doses. The spray of fluid, as a mist, will contact the eyes of the recipient chicks. It will also be possible, however, for the recipient birds to inhale the fluid droplets into the respiratory system, or ingest fluid by oral contact with fluid droplets that attach to feathers. Rubbing, shaking and physical contact between birds will also spread the fluid to most, if not all, treated birds. Once the desired coverage of the container has occurred, the pressurized fluid flow to the spray nozzle assembly may be arrested, the open-topped container removed from beneath the cover, replaced with a fresh container of chicks and the procedure repeated. Large numbers of birds or chicks, therefore, may be rapidly and uniformly contacted with a fluid with minimal handling of the birds.

Various objects, features, and advantages of the invention will become more apparent upon review of the detailed description set forth below when taken in conjunction with the accompanying drawing figures, which are briefly described as follows.

BRIEF DESCRIPTION OF THE FIGURES

FIG. 3A is a bottom view of the U-bracket; FIG. 3B is a perspective view of the U-bracket; FIG. 3C is a front view of the U-bracket; FIG. 3D is a side view of the U-bracket.

FIG. 4A shows a front view of the L-bracket; FIG. 4B shows a top view of the L-bracket; FIG. 4C shows a side view of the L-bracket; FIG. 4D shows a perspective view of the L-bracket.

FIG. 8A shows a spray nozzle assembly having an elongated spray port; FIG. 8B shows a spray nozzle assembly having a round spray port and a fan-shaped spray nozzle; FIG. 8C shows a spray nozzle assembly having an elongated spray port and a fan-shaped spray nozzle.

DETAILED DESCRIPTION

Figure 1A:
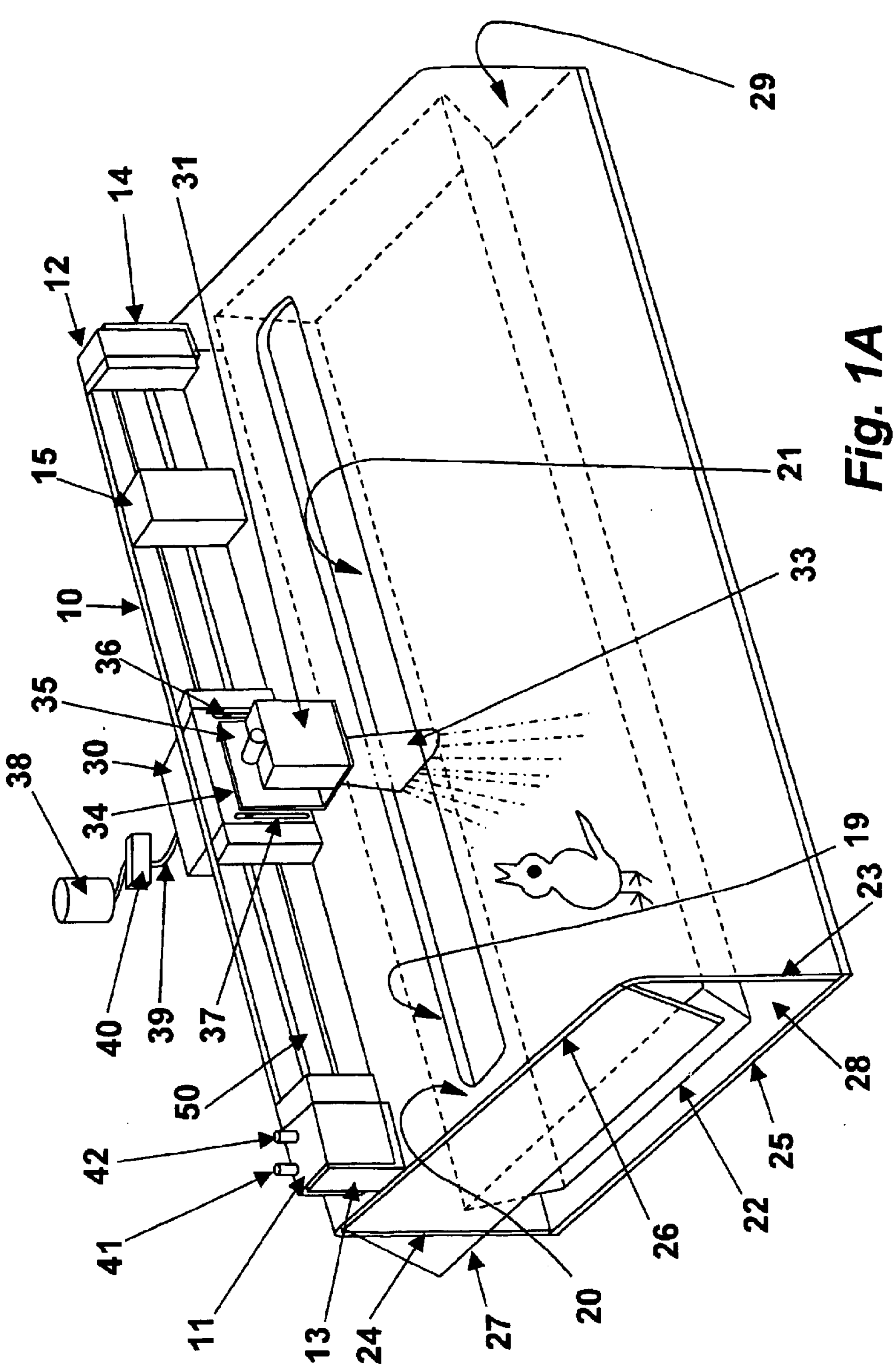
FIG. 1A illustrates a perspective view of a fluid spray apparatus according to the present invention.

A full and enabling disclosure of the present invention, including the best mode known to the inventor of carrying out the invention is set forth in this description, including reference to the accompanying drawings, wherein like reference numerals designate corresponding parts throughout several figures. This description is made for the purpose of illustrating the general principles of the invention and should not be taken in the limiting sense.

For convenience, certain terms employed in the specification, examples, and appended claims are collected here.

The term "bird" as used herein refers to males or females of any bird species. The present invention, therefore, may be practiced with any type of bird, including but is not limited to chicken, turkey, duck, goose, quail, pheasant, grouse, ratites or the chicks of any bird species. Ratites include flightless birds including ostrich, emu, cassowary and kiwi.

The term "vaccine" as used herein refers to an immunological composition given to an animal to elicit an immune response against an infectious agent. The term vaccine is meant to emcompasse vaccine for birds including poultry and including but not limited to infectious bronchitis vaccine, Mareck's disease vaccine, infection bursal disease vaccine, and the like.

The term "medicament" as used herein refers to any fluid used for medication and having a viscosity that allows a spray to be ejected from a spray nozzle assembly as a spray, including but not limited to a liquid that is aerosolized, vaporized, solubilized, and the like.

The present invention provides a spray delivery system suitable for delivering a fluid spray to objects in an open-topped container. This aspect of the present invention is particularly useful for delivering a fluid spray, such as a vaccine, or a medicament to small birds including chicks. With reference now to FIG. 1, the apparatus of the present invention for delivering a fluid spray to an open-topped container 22 generally includes an elongated guide rail 10 having a first 11 and a second 12 buffer stop disposed at opposing ends of the elongated guide rail 10. The first and second buffer stops 11 and 12 are attached to a top surface of a cover 20 having a horizontal top 26 with an elongated slot 21 therein, and descending sidewalls 23, 24 joined to outer edges of the horizontal top 26. The descending sidewalls 23, 24 may stand on any substantially level surface, thereby defining with the horizontal top 26 a tunnel having an entrance 28 capable of receiving an open-topped container 22. Optionally, the cover 20 may further comprise a base 25 attached to the lower edges of the descending sidewalls 23, 24. It is contemplated, however, that the cover 20 having the elongated guide rail 10 thereon, may be suspended over an open-topped container 22, with the sidewalls not contacting a base. The entrance 28 and an exit 29 of the tunnel may each be sealed with a hinged flap 27 or a curtain or the like attached to the cover 20, and which can prevent escape of the birds that are to be sprayed, or to prevent escape of spray from the tunnel. The preferred open-topped container 22 is of standard design and usually to be filled with about 100 baby chicks. This contains the chicks in a crowded condition in which the chicks are in physical contact with one another.

Figure 5:
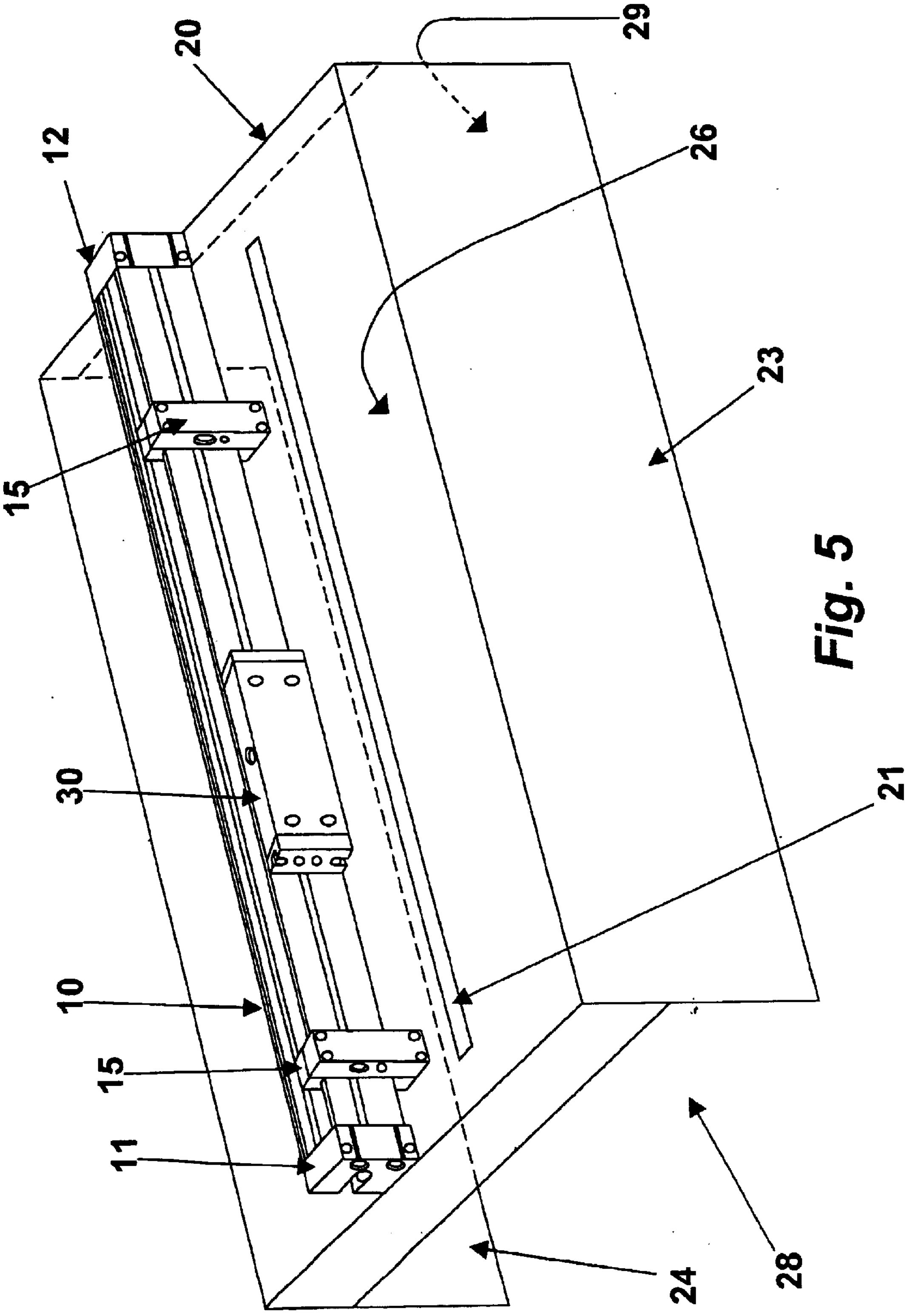
FIG. 5 illustrates a perspective view of an embodiment of the spray delivery apparatus according to the present invention wherein the elongated guide rail is mounted directly to the cover.

The first 11 and the second 12 buffer stops are positioned on the top surface 19 of the horizontal top 26 such that the elongated guide rail 10 is substantially parallel to the elongated slot 21 in the horizontal top 26. It is contemplated for the first and second buffer stops 11 and 12 to be attached to the cover 20 by any means that will securely fasten the elongated guide 10 to the cover 22. A preferred means of attachment is U-brackets 13 and 14. One embodiment of a U-bracket 13, 14 suitable for securing an elongated guide rail 10 to a cover 20 according to the present invention, is illustrated in FIGS. 3A–3D. However, in another embodiment, the elongated guide rail is attached to a cover without the use of U-brackets 13, 14, as shown in FIG. 5.

The apparatus of the present invention further comprises at least one spray head 30 slideably disposed on the elongated guide rail 10 and capable of reversibly traveling from the first buffer stop 11 to the second buffer stop 12. The spray head(s) 30 is operably connected to a switchable power means for reversibly moving the spray head 30. It is contemplated that the spray delivery system of the present invention may comprise more than one spray head 30, each spray head 30 being capable of moving in the same direction or in opposite directions from each other. Each spray head 30 may each have a switchable power means for moving the spray head 30. The spray heads may also be linked, or the switchable power means are controlled, so that the spray heads 30 move in the same direction or in opposite directions.

Figure 6:
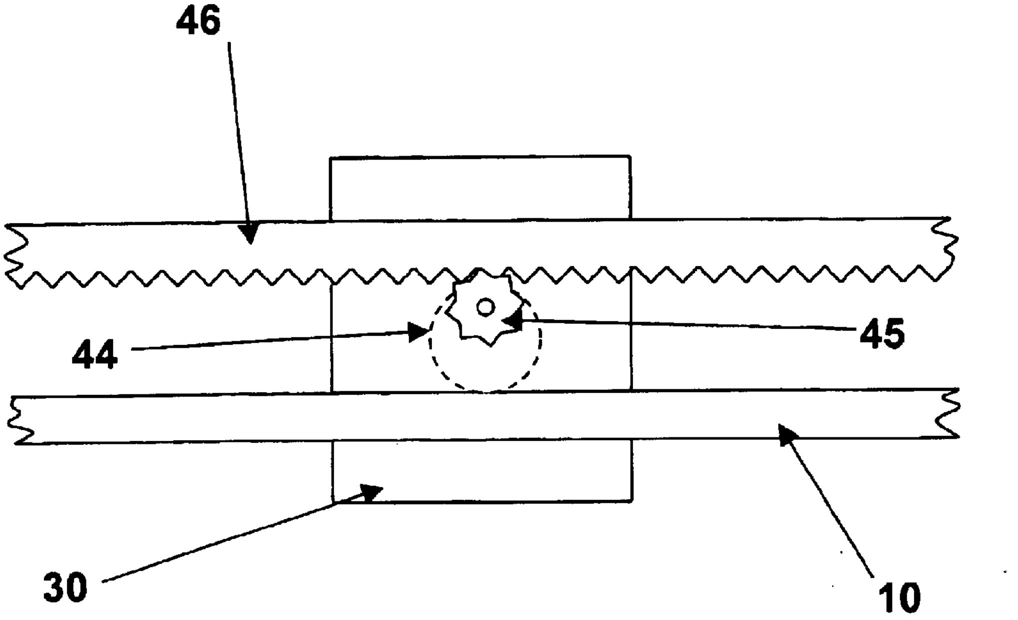
FIG. 6 illustrates a partial view of a region of an elongated guide rail of the present invention wherein the spray head has an electrically powered motor having a toothed wheel, with the toothed wheel engaged with a toothed rail to allow movement of the spray head along the elongated guide rail.
Figure 7:
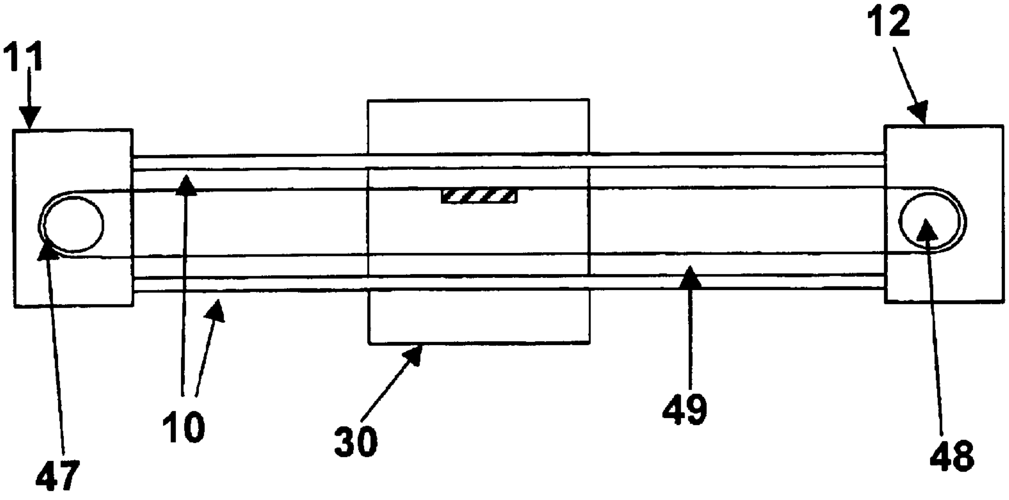
FIG. 7 illustrates an elongated guide rail of the present invention wherein the spray head is attached to a powered belt for moving the spray head along the elongated guide rail.
Figure 6A:
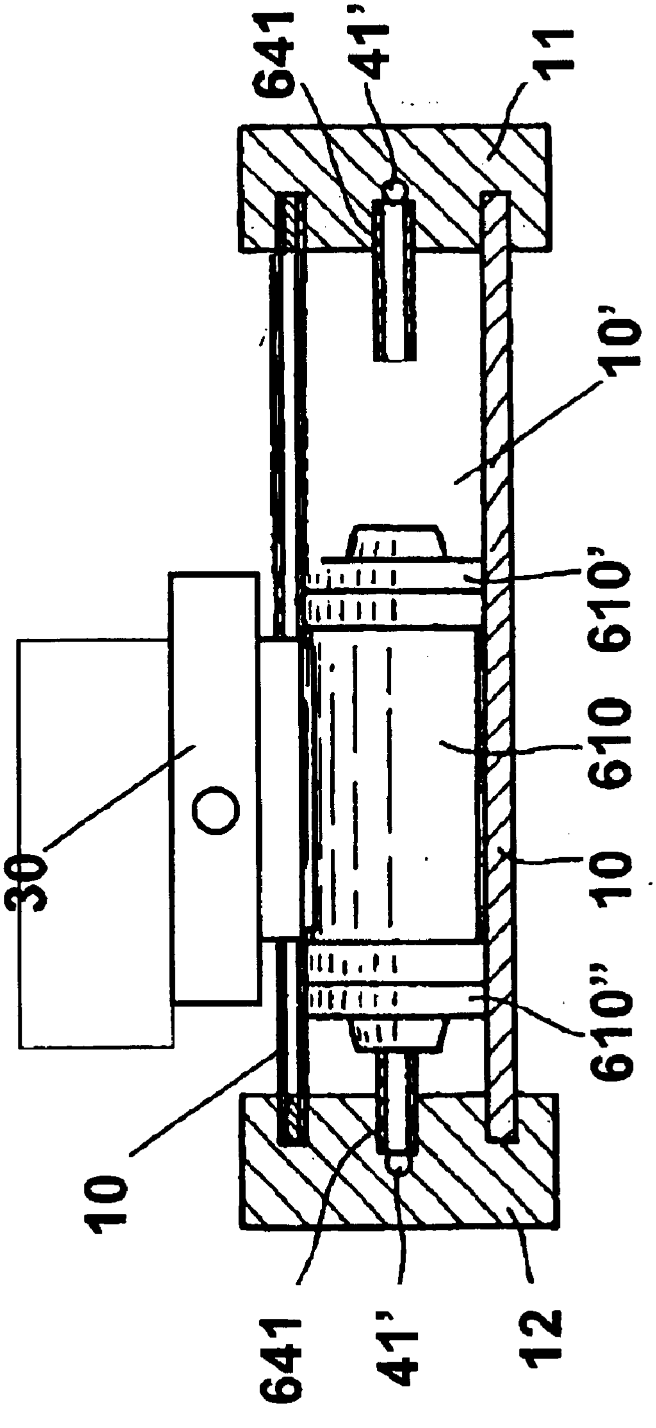
FIG. 6A shows in plan view another embodiment wherein the spray head is connected to rodless cylinder elongated guide rail that may be pneumatically operated by compressed air to move the spray head along the elongated guide rail.

In one embodiment of the present invention, the first buffer 11 stop may further comprise a hydraulic fluid inlet port 41 and a fluid outlet port 42, each operably connected to a hydraulic pump and an extendable means operably connected to the spray head 30. The extendable means may, for example, be a piston capable of pushing or pulling the spray head 30 along the elongated guide rail 10. In another embodiment, the spray head 30 is connected to a rodless cylinder elongated guide rail 10 that may be pneumatically operated by compressed air to move the spray head 30 along the elongated guide rail 10, as shown in FIG. 6A (guide rail 10 forms chamber 10' in which piston 610, having ends 610' and 610", is positioned, and spray head 30 is operably connected to piston 610, whereby compressed air from inlet(s) 41' enters and exits chamber 10' via tube(s) 641 and moves piston 610 and hence spray head 30 thereby moves along guide rail 10). In yet another embodiment, the switchable power means is an electrically powered toothed wheel system comprising an electric motor 44 having a toothed wheel 45 attached to a rotor of the motor and engaging a toothed track 46 on the elongated guide rail 10 as shown in FIG. 6, an electrically powered belt driven system comprising an electric motor attached to the first buffer stop 11 and having a first pulley wheel 47 attached to the rotor, thereof, a second pulley wheel 48 attached to the second buffer stop 12 and a belt 49 passing over the first 47 and second 48 pulley wheels, wherein the belt 49 is also attached to the spray head 30 as shown in FIG. 7.

Figure 8A:
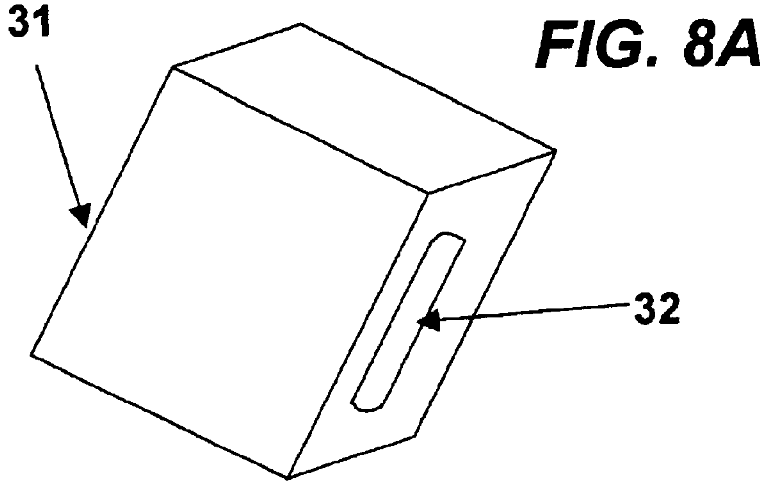
FIGS. 8A–8C illustrate embodiments of the spray nozzle assembly according to the present invention.

The spray head 30 further comprises a spray nozzle assembly 31 capable of receiving a pressurized fluid from a fluid container 38 and of ejecting a pressurized fluid to form a fan-shaped droplet (or mist) spray of fluid. The spray nozzle assembly 31 comprises a spray port 32 and optionally a fan-shaped spray nozzle 33. The spray nozzle assembly 31 may eject a pressurized fluid through the spray port 32 capable of delivering a fan-shaped spray of sufficient width in a long-axis to spray fluid droplets over substantially all of the width of an open-topped container 22 placed in the tunnel beneath the spray nozzle assembly 31, as shown in FIG. 1A. In one embodiment, the spray port 32 may be elongated in the dimension of the width of the fan-shaped spray, as shown in FIG. 8A.

Figure 8B:
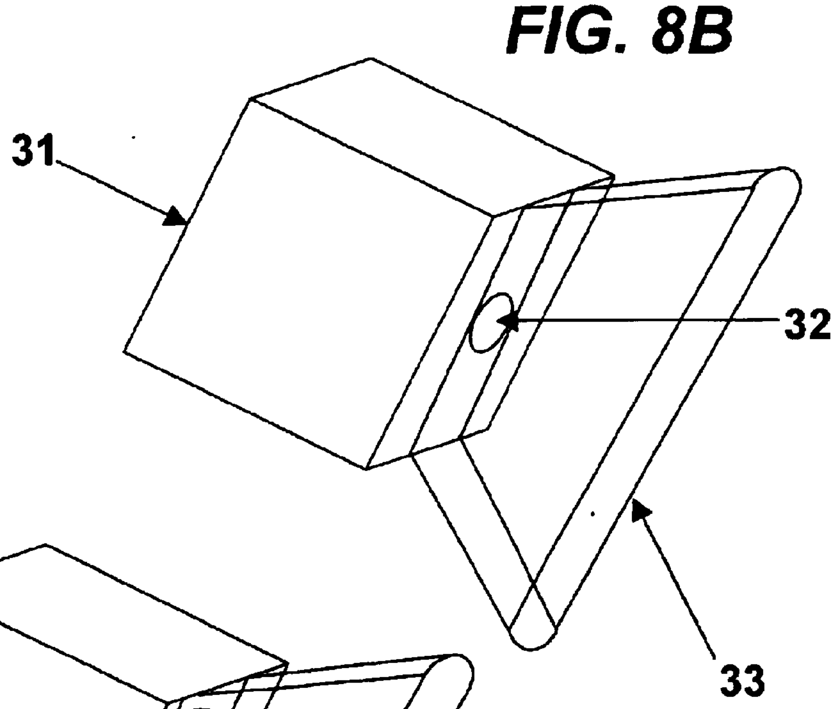

In another embodiment of the present invention, the fan-shape of the spray may be formed by ejection of the pressurized fluid from the spray port 32 that may be of any geometric shape, with the fan-shaped spray being formed by passage of the fluid spray stream through a substantially flattened fan-shaped spray nozzle 33, as shown in FIG. 8B.

Figure 8C:
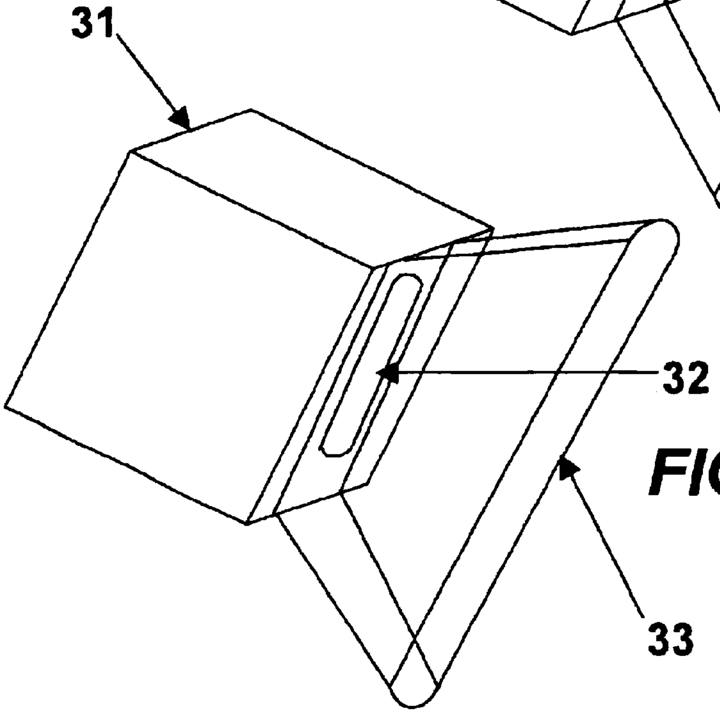

In yet another embodiment, the fan-shape of the spray may be formed by ejection of the pressurized fluid through a combination of an elongated spray port 32 and a substantially flattened fan-shaped spray nozzle 33, as shown in FIG. 8C.

The spray nozzle assembly 31 may be directly attached to the spray head 30 by means of an adjustable L-bracket 34. A suitable L-bracket 34 for use in the present invention, as illustrated in FIGS. 4A–4D, comprises a back-plate 35 having at least one slot 36 capable of receiving a locking screw 37. Release of the locking screw 37 loosens, the spray nozzle assembly 31 relative to the spray head 30, thereby allowing the height of the spray nozzle assembly 31 to be adjusted relative to an open-topped container 22 beneath, and thereby adjusting the width of the fluid spray delivered to the open-topped container 22. The greater the height of the spray nozzle assembly 31, the wider the spray contacting the open-topped container 22, or the birds therein. This feature is particularly useful to prevent wastage of a valuable fluid such as a vaccine by reducing overspray of the container 22, or from spraying more of the container 22 than is necessary, such as when the container 22 is not full. Once the spray nozzle assembly 31 is at the desired height, the screw(s) 37 may be tightened to maintain the spray nozzle assembly 31 in the selected position. Undesired spraying of the open topped container 22 may also be reduced by an adjustable buffer stop 15 that can restrict the travel of the spray head 30 along the elongated guide rail 10.

Figure 1C:
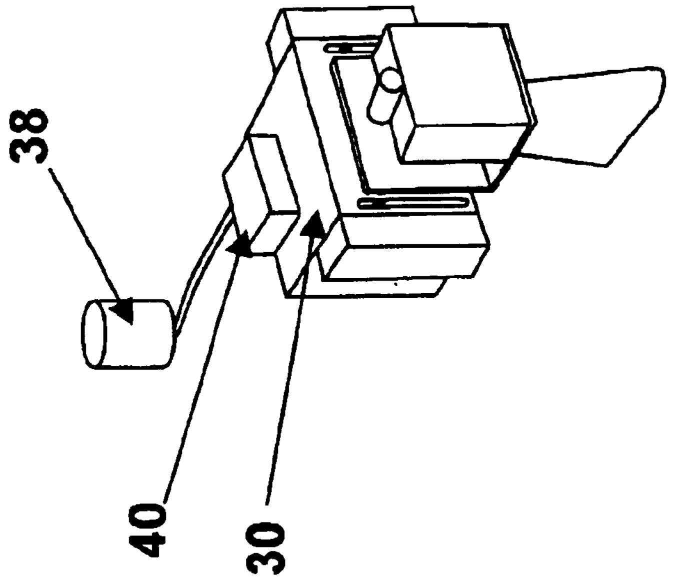
FIG. 1C illustrates an embodiment of the invention wherein a pump is mounted on the movable spray head.
Figure 1B:
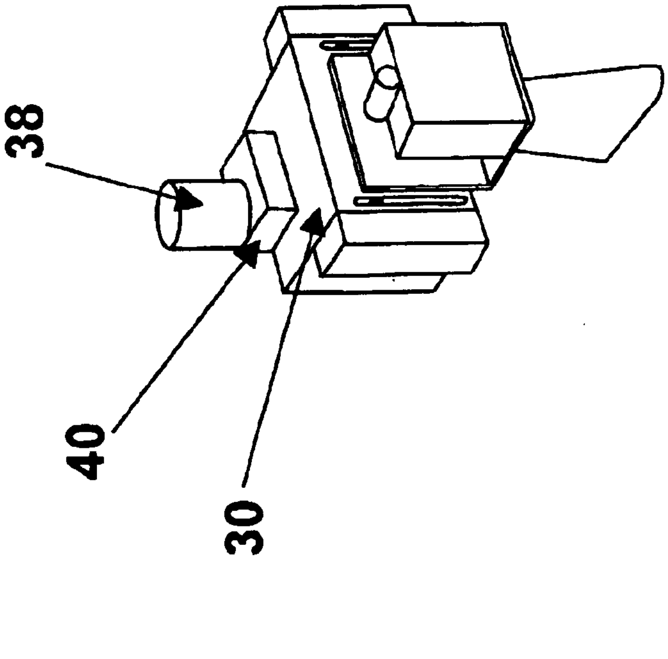
FIG. 1B illustrates an embodiment of the invention wherein a fluid container is mounted on the spray head.
Figure 2A:
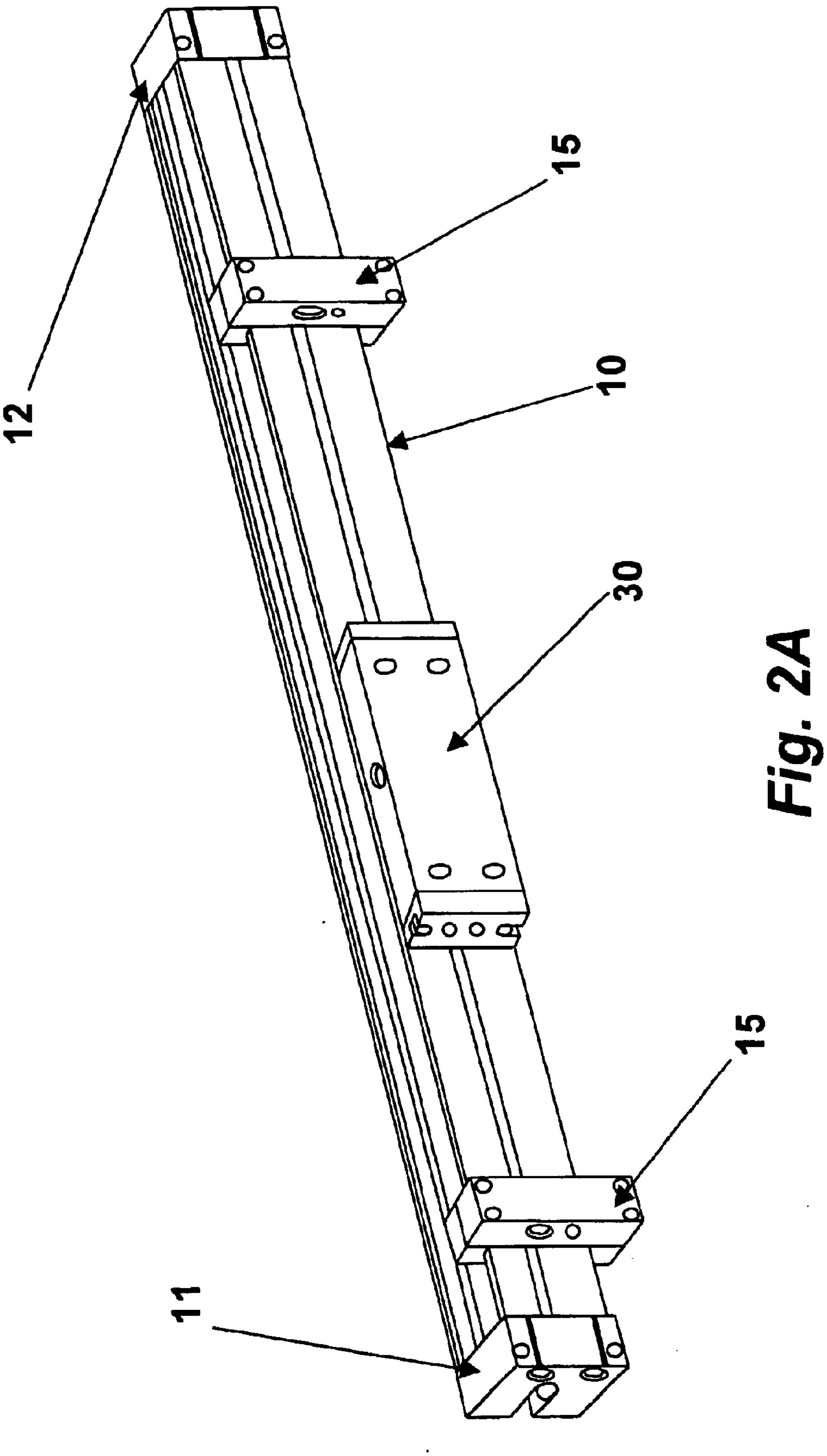
FIG. 2A illustrates a perspective view of an elongated guide rail having two end buffer stops, two adjustable buffer stops and a spray head thereon.
Figure 2B:
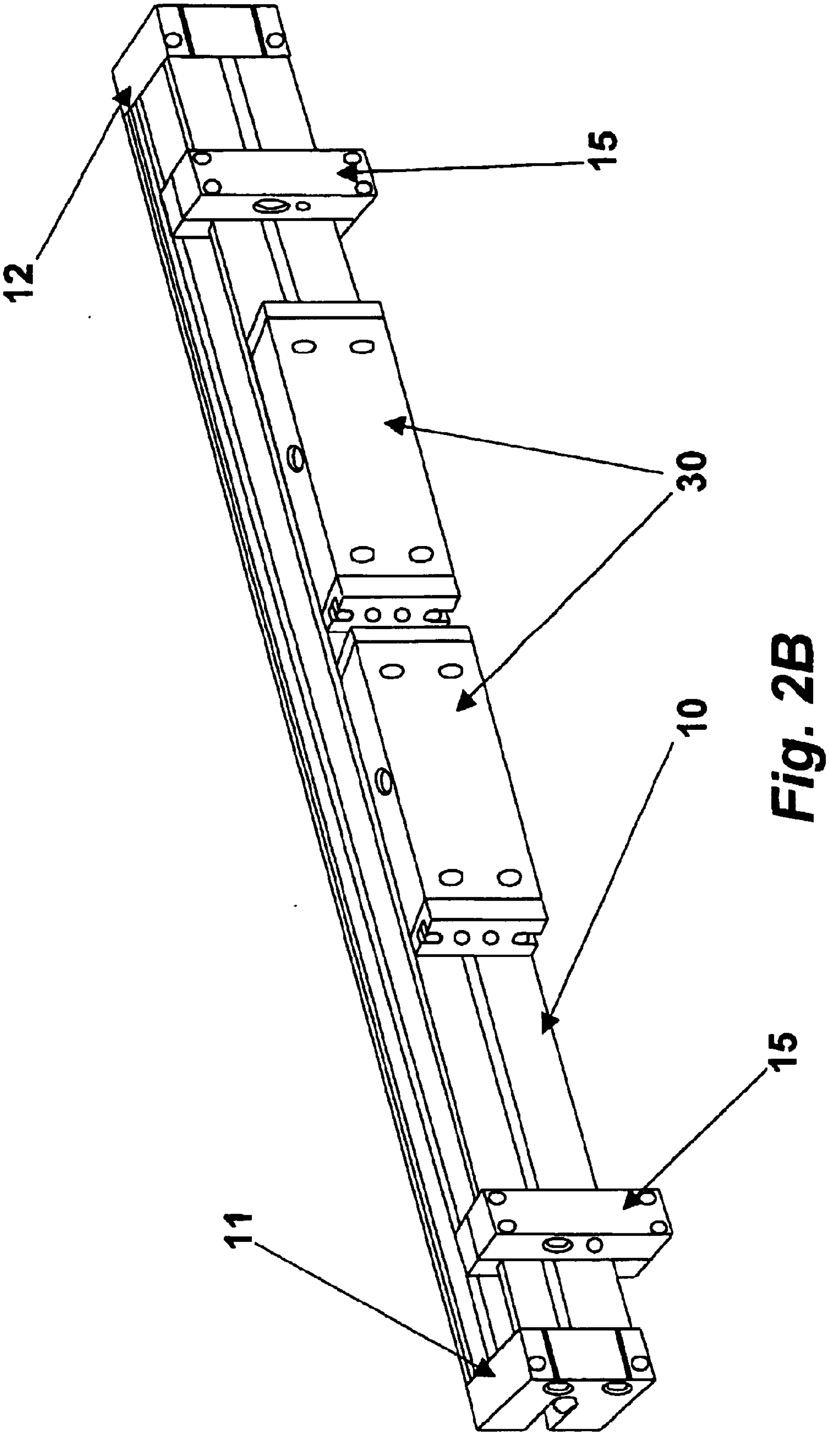
FIG. 2B illustrates a perspective view of an embodiment of the present invention, wherein the elongated guide rail has two spray heads.
Figure 3A:
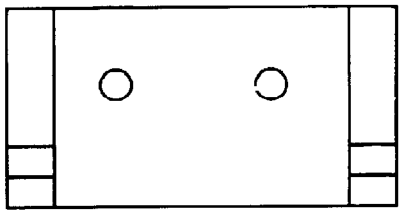
FIGS. 3A–3D illustrate a U-bracket for mounting an elongated guide rail to a cover according to the present invention.
Figure 3B:
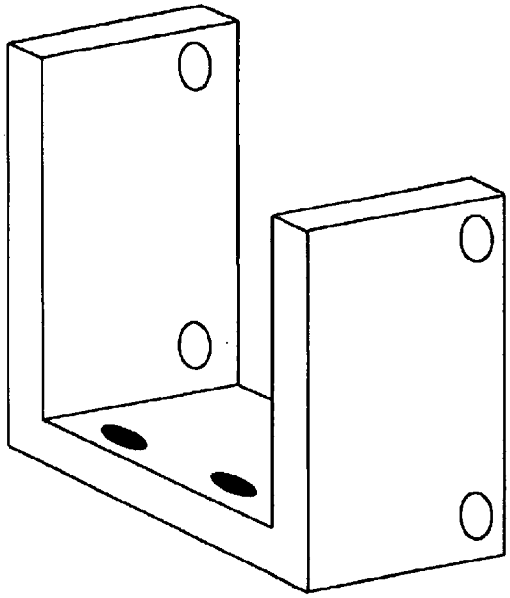
Figure 3C:
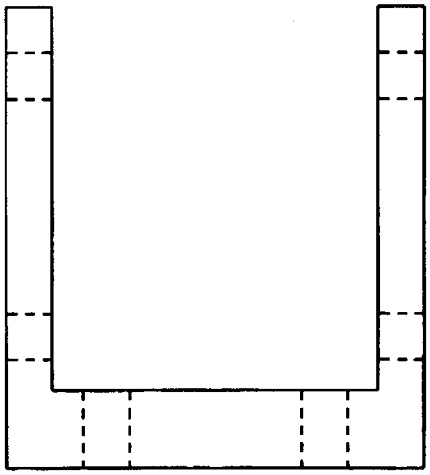
Figure 3D:
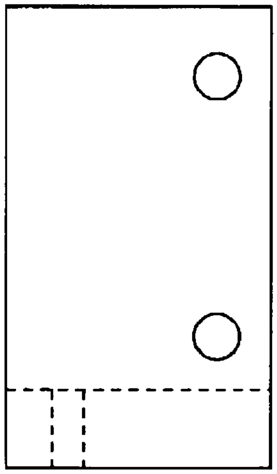
Figure 4A:
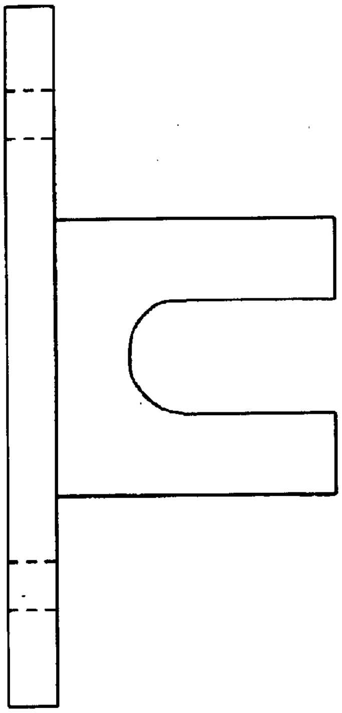
FIGS. 4A–4D illustrate an L-bracket for mounting a spray nozzle assembly to a spray head according to the present invention.
Figure 4B:
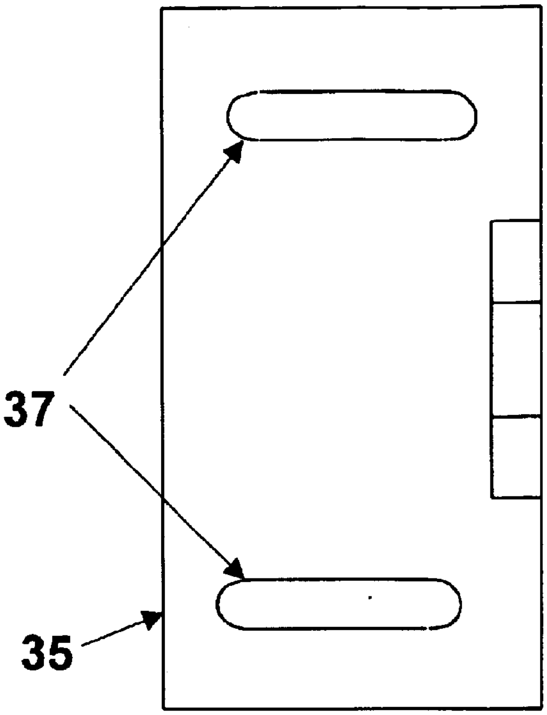
Figure 4C:
Figure 4D:
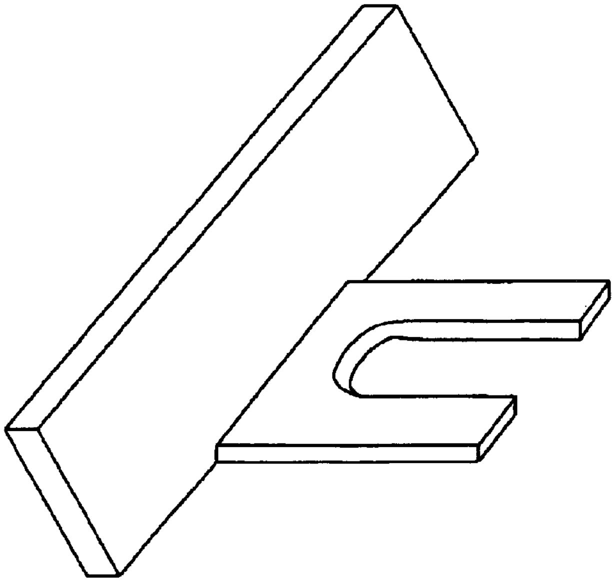

As illustrated in FIGS. 1A, 1B, 1C, the spray nozzle assembly 31 is operably connected to at least one fluid container 38 by means of a delivery tube 39. The fluid spray apparatus of the present invention further comprises a means of delivering a pressurized fluid from the fluid container 38 to the spray nozzle assembly 31. Preferably, the means of delivery is a pump that is operably connected to the fluid container 38 and the spray nozzle assembly 31. It is also contemplated for the fluid container 38 to be pressurized by a compressed gas, thereby forcing the fluid to the spray nozzle assembly 31 without using an interceding pump 40. An exemplary means of applying a pressure to the fluid is described in U.S. Pat. No. 4,316,464 incorporated herein by reference in its entirety. It is further contemplated that the fluid can also be sucked from the fluid container 38 and then delivered to the spray port 32 by a compressed air stream generated from a compressor or air tank operably connected to the spray nozzle assembly 30. The pressurized fluid will then be ejected from the spray nozzle assembly 31 through the spray port 32.

In one embodiment of the present invention, the fluid container 38, and optionally the pump 40, is secured to the moveable spray head 30 and therefore moves with the spray head 30 along the elongated guide rail 10.

In another embodiment of the present invention, the fluid container 38, and optionally the pump 40, is not rigidly attached to the spray head 30. In this embodiment, the fluid container 38 and pump 40 are connected to the spray head 30 by a flexible delivery tube 39. It is contemplated that in this embodiment, therefore, the fluid container 38 and pump 40 are attached to the cover 20 or other fixed portion of the spray apparatus.

One embodiment of the apparatus for delivering a fluid spray to an open-topped container of the present invention, therefore, comprises (a) an elongated guide rail 10 having a first 11 and a second 12 buffer stop disposed thereon, (b) a cover 20, the cover 20 having a horizontal top 26 with a top surface 19 and two substantially parallel descending sidewalls 23, 24, the horizontal top 26 having an elongated slot 21 substantially parallel to the elongated guide rail 10, and wherein each buffer stop 11, 12 is attached to the cover 20, (c) at least one spray head 30 slideably disposed on the elongated guide rail 10, wherein the spray head 30 has mounted thereon a spray nozzle assembly 31 capable of delivering a fluid from a fluid container 38 as a fan-shaped fluid spray, (d) a means of delivering a fluid from a fluid container 38 to the spray nozzle assembly 31, and (e) a switchable powered means for reversibly moving the spray head 30 along the elongated guide rail 10.

In another embodiment of the present invention, the first and second buffer stops 11, 12 are attached to the cover 20 by U-brackets 13, 14.

In one embodiment of the present invention, the apparatus further comprises a plurality of spray heads 30, wherein the number of spray heads 30 is selected to provide spray coverage over the entire area of an open-topped container 22.

In one embodiment of the present invention, the apparatus further comprises a fluid container 38 operably connected to a pump 40 and the spray nozzle assembly 31, wherein the pump 40 can deliver a pressurized fluid from the fluid container 38 to the spray nozzle assembly 31, and wherein the pressurized fluid is ejected from the spray nozzle assembly 31 as a fan-shaped spray.

In another embodiment of the present invention, the fluid container 38 is mounted on the cover.

In still another embodiment of the present invention, the pump 40 is mounted on the cover 20.

In yet still another embodiment of the present invention, the fluid container 38 is mounted on the movable spray head 30.

In one embodiment of the present invention, the fluid is delivered to the spray nozzle assembly 31 as a pressurized fluid by means of a compressed gas.

In one embodiment of the present invention, the pump 40 is mounted on the movable spray head 30.

In another embodiment of the present invention, the spray nozzle assembly 31 has an elongated spray port 32 capable of delivering a fan-shaped fluid spray.

In yet another embodiment of the present invention, the spray nozzle assembly 31 has a fan-shaped spray nozzle 33.

In one embodiment of the present invention, the elongated guide rail is a rodless cylinder with the moveable spray head 30 attached thereto, see FIG. 6A.

In still another embodiment of the present invention, the switchable power means is a hydraulic pump.

In yet still another embodiment of the present invention, the switchable power means comprises an electric motor 44 having a toothed wheel 45, the toothed wheel 45 engaging a toothed track 46 on the elongated guide rail 10.

In another embodiment of the present invention, the spray nozzle assembly 31 is mounted on the spray head by an L-bracket 34, the L-bracket 34 having at least one elongated slot 36 configured for adjusting the height of the spray nozzle assembly 31 over the open-topped container 22, and wherein the L-bracket 34 is attached to the spray head 30 by a screw 37.

In another embodiment of the present invention, the apparatus further comprises at least one adjustable buffer block 15.

Another aspect of the present invention is a method for delivery of a fan-shaped fluid spray to an open-topped container 22. While the method and apparatus of the present invention are suitable for spraying any fluid that has a viscosity that allows a spray to be ejected from a spray nozzle assembly as a spray such as a medicament, a vaccine or a mixture thereof, it is anticipated that the method of the present invention is particularly suitable for the spray delivery of a vaccine to recipient birds, such as chicks.

In the methods of the present invention, an open-topped container 22 holding, for example, a batch of chicks to be vaccinated, is provided. The open-topped container 22 is placed beneath the cover 20 and in the tunnel defined by the horizontal top 26 and the descending sidewalls 23, 24 of the cover 20, and a surface beneath the sidewalls 23, 24. The open-topped container 22 is preferably substantially below the elongated slot 21 of the cover 20. The fluid to be spray delivered to the open-topped container 22 may be delivered under pressure to the spray nozzle assembly 31 by operating a pump 40 operably located between the fluid container 38 and the spray nozzle assembly 31. Optionally, the fluid may be delivered by a compressed air stream that pulls the fluid from a fluid container 38, and through the spray port 32, or by top pressure applied to the fluid in the fluid container 38 and that can push the fluid out of the fluid container 38, as described in U.S. Pat. No. 4,316,464 incorporated herein by reference in its entirety.

The spray head 30 may then be reversibly moved along the elongated guide rail 10 by operating a switchable power means. The number of reciprocal passages of the spray head 30 along the elongated slot 21 is selected to provide a desired degree of spray coverage of the recipient objects. Once the selected degree of spray coverage has been attained, the pressurized fluid flow to the spray nozzle assembly 31 is arrested.

When the spray cycle has been completed, it is desirable to remove the chick containers from the cabinet so that the next chick container can be inserted into the cabinet. The sprayed chick containers usually are stacked one atop the other and the side vent openings in the chick containers permit proper ventilation for the chicks.

After the spray cycle has been completed, the droplets of fluid will have been sprayed to the upper body portions of the chicks in each chick container. Some of the droplets will make direct contact with the eyes of the chicks, thus causing some of the chicks to be directly vaccinated. Other droplets will come to rest on the upper body portions of the chicks. The natural movements of the chicks in the chick container and the crowded conditions of the chicks in the container result in some of the droplets being rubbed from the upper body portions of the chicks into the eyes of adjacent chicks. Additionally, some of the chicks respond to the spray by shaking their heads and upper body portions. This causes some of the droplets to be splashed into the eye openings of adjacent chicks. When the fluid enters the eye opening of a chick, it tends to migrate through the nasal passages of the chick to be ingested by the chick. Also, some of the chicks tend to peck at droplets of fluid that are supported on the upper body portions of adjacent chicks. This results in some of the fluid being ingested orally by the chicks. It is desirable to retain the chicks in the chick containers for a period sufficient for the natural body motions and instincts of the chicks to disseminate the vaccine among the chicks in this manner.

One embodiment, therefore, of the method of the present invention for delivering a fan-shaped fluid spray to an open-topped container 22, comprises the steps of providing an open-topped container 22 having therein objects desired to receive a fluid spray, positioning the open-topped container 22 below the cover 20 of the spray delivery apparatus according to the present invention, operating the means to deliver a fluid from the fluid container 38 to the spray nozzle assembly 31, whereby the fluid is ejected from the spray nozzle assembly 31 as a fan-shaped spray directed towards the open-topped container 22, and operating the switchable powered means, thereby reversibly moving the spray head 30 along the elongated guide rail 10 so that the fan-shaped spray is delivered substantially over the area of the open-topped container 22 and the objects therein.

In another embodiment of the method of the present invention, the step of reversibly moving the spray head 30 along the elongated guide rail 10 is repeated at least once.

In another embodiment of the method of the present invention, the objects in the open-topped container 22 are birds.

In another embodiment of the method of the present invention, the fluid ejected from the spray nozzle assembly 31 comprises a vaccine.

In yet another embodiment of the method of the present invention, the fluid ejected from the spray nozzle assembly 31 comprises a medicament.

With respect to the above description, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawing and described in the specification are intended to be encompassed by the present invention. Further, the various components of the embodiments of the invention may be interchanged to produce further embodiments and these further embodiments are intended to be encompassed by the present invention.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. An apparatus for delivering a fluid spray to an open-topped container, comprising:

(a) an elongated guide rail having a first and a second buffer stop disposed thereon;

(b) a cover, the cover having a horizontal top with a top surface and two substantially parallel descending side-walls, the horizontal top having an elongated slot substantially parallel to the elongated guide rail, and wherein each buffer stop is attached to the cover;

(c) a spray head slideably disposed on the elongated guide rail, wherein the spray head has mounted thereon a spray nozzle assembly capable of delivering a fluid from a fluid container as a fan-shaped fluid spray;

(d) a means of delivering a fluid from a fluid container to the spray nozzle assembly; and, (e) a switchable powered means for reversibly moving the spray head along the elongated guide rail.

2. The apparatus according to claim 1, wherein the first and second buffer stops are mounted to the cover by U-brackets.

3. The apparatus according to claim 1, further comprising a plurality of spray heads.

4. The apparatus according to claim 1 further comprising a fluid container operably connected to a pump and the spray nozzle assembly, wherein the pump can deliver a fluid from the fluid container to the spray nozzle assembly, and wherein the fluid is ejected from the spray nozzle assembly as a fan-shaped spray.

5. The apparatus according to claim 4, wherein the fluid container is mounted on the cover.

6. The apparatus according to claim 4, wherein the pump is mounted on the cover.

7. The apparatus according to claim 4, wherein the fluid container is mounted on the movable spray head.

8. The apparatus according to claim 4, wherein the pump is mounted on the movable spray head.

9. The apparatus according to claim 1, wherein the spray nozzle assembly has an elongated spray port capable of delivering a fan-shaped fluid spray.

10. The apparatus according to claim 1, wherein the spray nozzle assembly has a fan-shaped spray nozzle.

11. The apparatus according to claim 1, wherein the switchable power means is a hydraulic pump.

12. The apparatus according to claim 1, wherein the switchable power means comprises an electric motor having a toothed wheel, the toothed wheel engaging a toothed track on the elongated guide rail.

13. The apparatus according to claim 1, wherein the switchable power means comprises a pneumatically operated rodless cylinder.

14. The apparatus according to claim 1, wherein the switchable power means comprises a belt attached to the spray head, wherein the belt is operably held by at least two pulleys, and wherein a pulley is operably attached to an electric motor and each pulley is rotatably attached to a buffer stop.

15. The apparatus according to claim 1, wherein the spray nozzle assembly is mounted on the spray head by an L-bracket, the L-bracket having at least one slot configured for adjusting the height of the spray nozzle assembly over the open-topped container, and wherein the L-bracket is secured to the spray head by a screw.

16. The apparatus according to claim 1, further comprising at least one adjustable buffer block.

17. The apparatus according to claim 1, wherein the cover is suspended.

18. A method of delivering a fan-shaped fluid spray to an open-topped container, comprising the steps of:

(a) providing an open-toped container having therein objects desired to receive a fluid spray (b) positioning the open-topped container in a tunnel defined by the cover of the apparatus according to claim 1;

(c) operating a pump, thereby delivering from the fluid container a fluid under pressure to the spray nozzle assembly, whereby the fluid is ejected from the spray nozzle assembly as a fan-shaped spray directed towards the open-topped container; and (d) operating the switchable powered means, thereby reversibly moving the spray head along the elongated guide rail so that the fan-shaped spray is delivered substantially over the area of the open-topped container and the objects therein.

19. The method according to claim 15, wherein step (d) is repeated at least once.

20. The method according to claim 15, wherein the objects in the open-topped container are birds.

21. The method according to claim 15, wherein the fluid ejected from the spray nozzle assembly comprises a vaccine, a medicament or a mixture thereof.

22. The method according to claim 15, wherein the fluid ejected from the spray nozzle assembly is a vaccine.

* * * * *

UNITED STATES PATENT AND TRADEMARK OFFICE

CERTIFICATE OF CORRECTION

PATENT NO. : 6,910,446 B2
APPLICATION NO. : 10/350557
DATED : June 28, 2005
INVENTOR(S) : Johnston It is certified that error appears in the above-identified patent and that said Letters Patent is hereby corrected as shown below:

Column 10, Claim 19, Line 55 should read

19. The method according to claim "15" --18--, wherein step (d) is repeated at least once.

Column 10, Claim 20, Line 57 should read

20. The method according to claim "15" --18--, wherein the objects in the open-topped container are birds.

Column 10, Claim 21, Line 59 should read

21. The method according to claim "15" --18--, wherein the fluid ejected from the spray nozzle assembly comprises a vaccine, a medicament or a mixture thereof.

Column 10, Claim 22, Line 62 should read

22. The method according to claim "15" --18--, wherein the fluid ejected from the spray nozzle assembly is a vaccine.

Signed and Sealed this

First Day of July, 2008

Jon W. Dudas

JON W. DUDAS
*Director of the United States Patent and Trademark Office*